April 10, 1962 K. W. COCHRAN ET AL 3,029,382
ELECTRO-MAGNETIC FLAW FINDER
Filed Aug. 31, 1959 4 Sheets-Sheet 1

INVENTORS
K.W. Cochran &
W.B. Huckabay
BY
Jerry J. Dunlap
ATTORNEY

INVENTORS
K. W. Cochran &
W. B. Huckabay

ATTORNEY

INVENTORS
K.W. Cochran &
W.B. Huckabay
BY Jerry J. Dunlap
ATTORNEY

INVENTORS
K. W. Cochran &
W. B. Huckabay
BY
ATTORNEY

3,029,382
ELECTRO-MAGNETIC FLAW FINDER
Kenneth W. Cochran, Oklahoma City, Okla., and William B. Huckabay, Dallas, Tex., assignors to Russell C. Heldenbrand, New Iberia, La.
Filed Aug. 31, 1959, Ser. No. 837,181
14 Claims. (Cl. 324—37)

This invention relates to improvements in the art of measuring the magnitude and direction of magnetic fields, and more particularly, but not by way of limitation, to an improved apparatus for electro-magnetically detecting flaws in tubular ferromagnetic articles, such as oil field drill pipe and tubing.

As it is well known in the art, the flux leakage at the surface of a magnetized ferromagnetic article will vary at locations or points in the proximity of any variations in the structure of the article. Along the portions of the article where the granular and molecular structure of the article is uniform, the flux leakage along the surface of the article will be substantially uniform. However, any variation in the granular or molecular structure of the article will provide a distortion in the magnetic properties of the article and cause a variation in the leakage of magnetic flux at the adjacent surface of the article. The variations in flux leakage are rather prominent in the event the article is cracked or split transverse to the direction of the magnetic lines of flux, since a metal parting will provide distinct North and South magnetic poles on the opposite sides of the crack, it being understood that the severity of the crack or metal parting will control the prominence of the flux leakage. Other types of variations in the structure of the article, such as where the article has been stress hardened or where a crack extends substantially parallel with the lines of flux, also provide a variation of the flux leakage at the adjacent surface of the article, but the variation in leakage in these cases is rather minor and is usually difficult to detect.

It is also well known in the art to pass an electrical conductor through the magnetic field at the surface of a magnetized ferromagnetic article, which conductor is normally in the form of a pickup coil, and register the variations in current induced in the conductor by passage of the conductor through variations in such a magnetic field to detect the presence of flaws in the article. In this respect, and as used herein, the term "flaw" shall mean any discontinuity or variation in the granular or molecular structure of the article being inspected. In the case of devices for inspecting tubular articles, the prior devices are normally in the form of a plurality of pick-up coils supported by a suitable mechanism either adjacent the inner or the outer surface of the article to be inspected. The pick-up coils are normally moved lengthwise along the tubular article and variable currents are induced in the pick-up coils as the pick-up coils pass flaws in the article. However, the strength of the current induced in the pick-up coils not only depends upon the strength of the magnetic field through which the coils are passed, but also upon the speed of movement of the pick-up coils along the article. As a result, it is many times difficult to detect flaws in the article when the pick-up coils are merely moved along the article either manually or by a driving apparatus at a relatively small number of feet per second. Rather prominent cracks or pitting of the article will provide a substantial variation in the flux leakage and these types of flaws usually can be detected by merely moving the pick-up coils lengthwise along the article. However, the minor variations in the magnetic flux leakage caused by small cracks, minor pitting, and variations in the hardness of the article provide only minor distortions or variations in the magnetic field, and such flaws are very difficult to detect by merely moving a pick-up coil lengthwise along the article through the magnetic field.

Many efforts have been made to provide an apparatus which may be moved at any speed along an article and still have the apparatus detect minor variations in the magnetic field adjacent the surface of the article. For example, many prior workers in the art have attempted to utilize alternating current as the magnetizing means for an article, such that the flux leakage at the surface of the article will be in alternating form and result in a rapid cutting of magnetic lines of force by the pick-up coils, which would in turn induce larger currents in the pick-up coils. However, it has been found that the alternating current is effective only for the surface area portions of the article and does not give indications of deep or internal defects in the article.

It has also been proposed to rotate the pick-up coils on the supporting structure to move the pick-up coils alternately toward and away from the surface of a tubular article, such that the pick-up coils will cut the magnetic lines of force around the article at a high rate of speed compared with the speed of movement of the entire device along the article. These devices do provide improved results; however, a rather complicated mechanical structure is required, a substantial amount of energy is required to rotate the pick-up coils, and distortion frequently occurs in the current induced in the pick-up coils, particularly when the tubular article is slightly out of round. Finally, it has been proposed to provide a pick-up coil with a variable diameter core and either rotate the core within the pick-up coil or move the core partially in and partially out of the pick-up coil to vary the inductive characteristics of the pick-up coil at a speed greater than the speed of movement of the entire device along the magnetized article. In this latter event, however, a complicated mechanical system is also required to maintain the desired relationship between the core and the pick-up coil, and substantial energy is also required to move the entire core of the pick-up coil, such that this type of device has not been widely accepted by industry.

The present invention contemplates a novel flaw detecting apparatus which is highly sensitive to variations in a magnetic field through which the pick-up coils of the apparatus are passed, such that substantially all types of flaws in a magnetized article may be detected. The present apparatus utilizes a pick-up coil assembly wherein each pick-up coil is provided with a core piece which is retained a precise distance from the surface of the article being inspected to enhance the induction of current in the pick-up coil. The core assembly of each pick-up coil is provided with a gap or opening therethrough, and the reluctance across this gap is varied at a speed substantially higher than the speed of movement of the entire apparatus along the article being inspected, such that the strength of the current induced in the pick-up coil is increased. In a preferred embodiment, the portions of the core assembly of each pick-up coil forming the gap is provided with a magnetic material diaphragm, and a varying magnetic flux is induced in the diaphragm at right angles to the magnetic lines of flux extending between the adjacent portions of the core assembly, such that any increase in magnetic flux in the core assembly resulting from passage of the core assembly through a variable magnetic field is magnified by the varying magnetic current in the diaphragm to greatly increase the induction of current in the pick-up coil and greatly increase the sensitivity of the apparatus.

Broadly stated, the present invention contemplates a flaw detecting apparatus for inspecting a magnetized article, comprising a pair of opposite hand magnetic material core pieces, housing means supporting said core pieces with one set of their ends in spaced relation forming an air gap for positioning adjacent a surface of the magnetized article, means for moving said housing means along the magnetized article and moving said one set of ends of the core pieces through magnetic lines of flux leaking from said surface of the magnetized article, a pick-up coil around at least one of said core pieces for generating a current therein in proportion to variations in the magnetic flux density in said core pieces, means for registering the variations in current induced in the pick-up coil, and means for cyclically varying the reluctance between the opposite set of ends of said core pieces.

The present invention also contemplates a novel supporting assembly for each pick-up coil assembly, with a plurality of pick-up coil assemblies being supported in a single housing for individual movement of the pick-up coil assemblies transversely with respect to the surface of the article being inspected, such that each pick-up coil may be retained a precise distance from the surface of the article being inspected, regardless of variations in the surface of the article. Furthermore, this invention contemplates a novel calipering system utilizing any movement of the pick-up coil assemblies transversely with respect to the article being inspected for measuring the minimum diameter of the article when the apparatus is being used to inspect tubular goods.

An important object of this invention is to provide a novel apparatus for measuring the strength and direction of a magnetic field.

A more specific object of this invention is to provide a highly sensitive electro-magnetic flaw detecting apparatus which will detect substantially any type of flaw in a magnetized article.

Another object of this invention is to provide a novel electro-magnetic flaw detecting apparatus utilizing a pick-up coil assembly wherein current is induced in the pick-up coil at a much higher frequency than the frequency with which the pick-up coil cuts the magnetic lines of force adjacent a magnetized article being inspected.

Another object of this invention is to increase the strength of the current induced in a pick-up coil of an electro-magnetic flaw detecting apparatus when the pick-up coil is passed through a variable magnetic field, but wherein the current induced in the pick-up coil is not increased to any appreciable degree when the pick-up coil is being moved through a substantially uniform magnetic field.

Another object of this invention is to provide an accurate correlation of events appearing upon a log produced by an electro-magnetic flaw detecting apparatus and the article inspected, such that the precise location of any flaws in the article may be determined by inspection of the log.

A further object of this invention is to provide a novel calipering system in a flaw detecting apparatus utilized for inspecting tubular articles, such that the minimum diameter of the article may be determined simultaneously with the determination of flaws in the article.

Another object of this invention is to provide a novel electro-magnetic flaw detecting apparatus which will detect any flaws in a magnetized article being inspected, regardless of the speed which the apparatus is moved along the article being inspected.

A still further object of this invention is to provide a simply constructed electro-magnetic flaw detecting apparatus which may be economically manufactured and operated, and which will have a long service life.

Other objects and advantages of the invention will be evident from the following detailed description, when read in conjunction with the accompanying drawings which illustrate our invention.

Although the present invention is illustrated in the drawings and described in detail herein as being embodied in an apparatus used for inspecting oil field drill pipe by passage of the apparatus around the outer periphery of the drill pipe, it will be understood that the invention may also be utilized for inspecting other ferromagnetic articles, such as flat plates or other tubular goods, and that the apparatus may be utilized by passage through a tubular article, as well as along the outside surface of an article. Furthermore, it will be understood that the principles of this invention may be used to measure the strength and direction of substantially any magnetic field.

Figure 1:
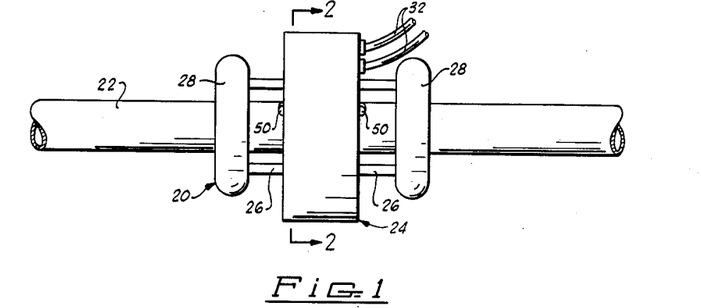
FIGURE 1 is a side elevational view of an apparatus constructed in accordance with this invention with the apparatus shown in assembly on a tubular article.
Figure 6:
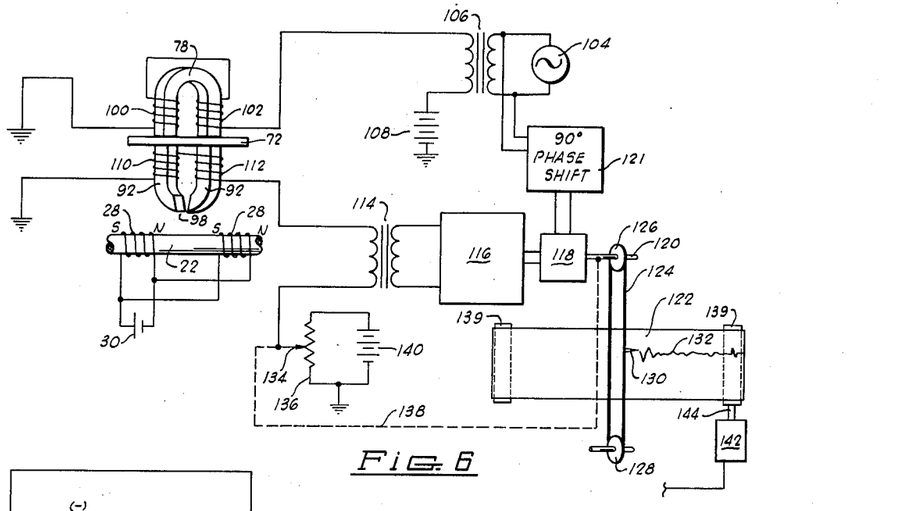
FIGURE 6 is a schematic drawing and wiring diagram of the preferred apparatus utilized for detecting and recording flaws in a magnetized article.

Referring to the drawings in detail, and particularly FIG. 1, reference character 20 generally designates a flaw detecting apparatus constructed in accordance with this invention and specifically designed for inspection of a joint of drill pipe 22 by detecting variations in a magnetic field surrounding the drill pipe 22. Basically, the present apparatus comprises an annular housing 24 of a size to be telescoped over the drill pipe 22 and having suitable braces 26 extending from the opposite ends thereof to support magnetizing coils 28 at the opposite ends of the main housing 24. As it is well known in the art, any flaws in the form of cracks in the drill pipe 22 will normally extend at least a short distance around the periphery of the pipe. Therefore, the magnetizing coils 28 are connected in parallel as illustrated in the wiring diagram in FIG. 6 to provide magnetization of the pipe 22 lengthwise along the pipe and provide a north magnetic pole in the pipe 22 at one end of the housing 24 and a south magnetic pole in the pipe 22 at the opposite end of the housing 24. Thus, the coils 28 will effectively magnetize that portion of the pipe 22 surrounded by the main housing 24. Any suitable source 30 of direct current energy may be connected to the coils 28 as shown in FIG. 6 to provide the desired saturation of that portion of the pipe 22 extending through the main housing 24. Normally, the source 30 will be in the form of a generator positioned in a truck or the like (not shown) located in the vicinity of the pipe being inspected and will be connected to the coils 28 by suitable cables 32 as illustrated in FIG. 1. These cables 32 are also utilized to contain conductors running to and from the main housing 24, as will be described.

The main housing 24 (see FIG. 2) comprises an outer ring 34 having annular end plates 36 secured to the opposite ends of the ring 34 by suitable bolt connections 38 to provide a rigid housing structure. However, the ring 34 and the end plates 36 are split at 40 to provide a two section housing construction, such that the two sections of the housing 24 may be placed over opposite sides of the pipe 22 and connected together to form a unitary structure for movement along the pipe 22. The two sections of the ring 34 are connected together at one side of the housing 24 by a suitable hinge 42, and a suitable latch 44 is provided at the opposite side of the ring 34 to hold the two sections of the housing together. It will be apparent that when the latch 44 is unfastened, the two sections of the housing 24 may be swung outwardly on the hinge 42 for removal or replacement of the housing 24 around the pipe 22.

Figure 2:
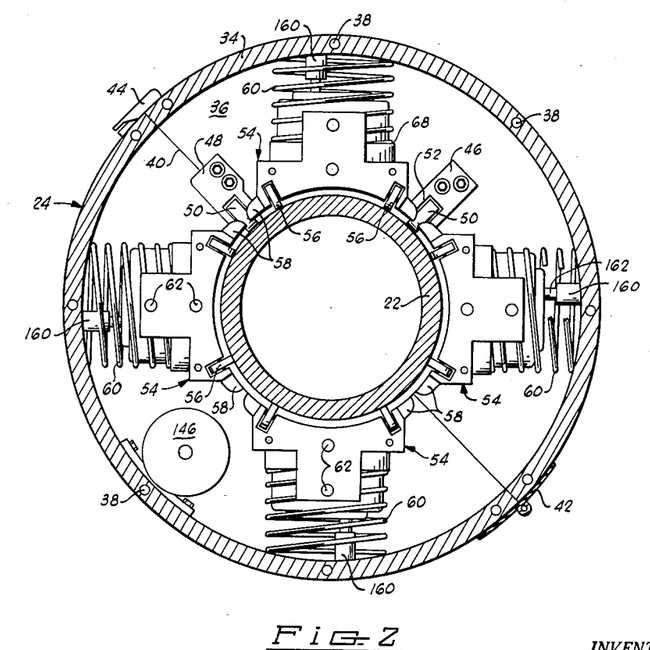
FIGURE 2 is an enlarged cross-sectional view through the main housing of the apparatus, as taken substantially along lines 2—2 of FIG. 1.

As also shown in FIG. 2, one of the sections of each end plate 36 is provided with a bracket 46 and a bracket 48 spaced substantially 90 degrees apart. Each of the brackets 46 and 48 has a suitable roller 50 secured therein for movably supporting housing 24 on the pipe 22. It will be apparent that since the rollers 50 are spaced substantially 90 degrees apart, the housing 24 will be supported on the upper portion of the pipe 22 and will be retained concentrically around the pipe 22 during movement of the housing along the pipe. Also, the bracket 48 preferably overlaps the split 40 at the respective end of the housing 24 to position the respective roller 50 in alignment with the split 40, such that all of the rollers 50 will be carried by the mating half portions of the end plates 36, and yet the housing 24 will be supported on the pipe 22 in such a position that the latch 44 will be readily accessible to the operator for convenience in removing the housing from and placing the housing on the pipe 22. In a preferred embodiment, the end plates 36 are cut away at 52 around the rollers 50, such that the rollers 50 project through the respective ends of the housing 24 and provide an economical construction.

A plurality of pick-up coil assemblies, generally designated by reference characters 54, are supported in circumferentially spaced relation in the housing 24 to scan the entire outer periphery of the pipe 22 during movement of the apparatus 20 lengthwise along the pipe. Each pick-up coil assembly 54 has four rollers 56 suitably secured in the inner portion thereof to support the curved pole pieces 58 of the respective pick-up coil assembly concentrically on the pipe 22. It will be observed in FIG. 2 that the pole pieces 58 are curved lengthwise on the arc of a circle having a diameter slightly larger than the outer diameter of the pipe 22 and are retained concentric with respect to the pipe 22 when the respective rollers 56 are in engagement with the outer periphery of the pipe.

The rollers 56 of each pick-up coil assembly 54 are retained in contact with the outer surface of the pipe 22 by a suitable coil spring 60 anchored to the pick-up coil assembly, as will be described, and contacting the adjacent portion of the ring 34 of the housing 24. Thus, each spring 60 will urge the respective pick-up coil assembly 54 toward the pipe 22 and will retain the respective rollers 56 in contact with the outer surface of the pipe 22, regardless of the precise roundness of the pipe 22. In this connection, it may also be noted that each pick-up coil assembly 54 is provided (see also FIG. 5) with two pins 62 in each side thereof which extend through mating radially extending slots 64 in the adjacent housing end plate 36, such that the pins 62 and slots 64 prevent circumferential movement of the pick-up coil assemblies 54, but allow radial movement of the pick-up coil assemblies to follow irregularities in the contour of the pipe 22. As also shown in FIG. 5, the pins 62 may be easily threaded into the adjacent portions of the pick-up coil assembly 54, and the width of each pick-up coil assembly 54 is substantially equal to the length of the housing 24, such that each pick-up coil assembly 54 will be adequately secured in its respective position in the housing 24.

Figure 3:
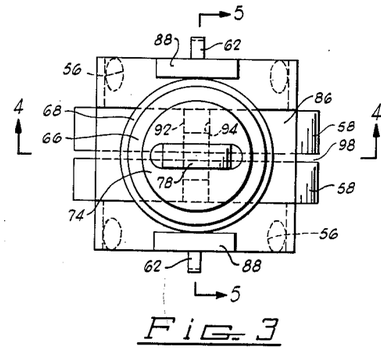
FIGURE 3 is a plan view of a typical pick-up coil assembly of the type utilized in the apparatus shown in FIG. 2.
Figure 4:
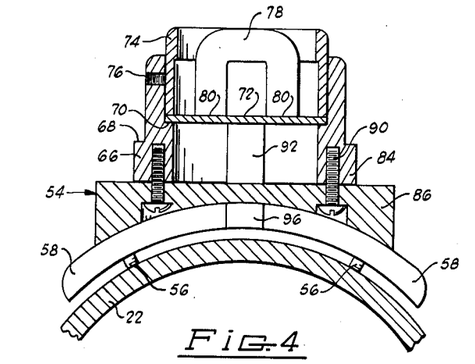
FIGURE 4 is an enlarged sectional view through a pick-up coil assembly, as taken substantially along lines 4—4 of FIG. 3.
Figure 5:
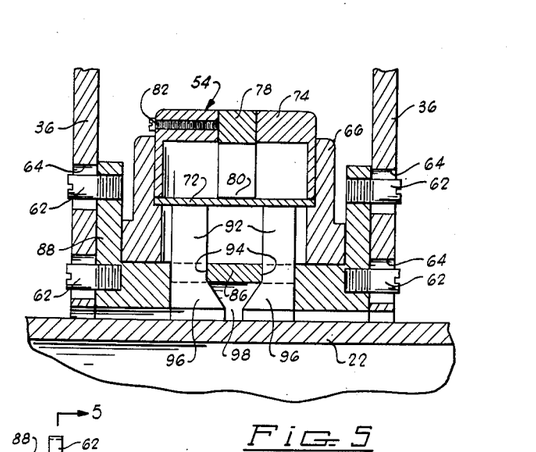
FIGURE 5 is another enlarged sectional view taken at right angles to the view shown in FIG. 4, which is substantially along lines 5—5 of FIG. 3.

A typical pick-up coil assembly 54 is illustrated in detail in FIGS. 3, 4 and 5 and comprises a tubular housing 66 having an upwardly or outwardly facing circumferential shoulder 68 thereon to receive the inner end of the respective coil spring 60 (shown only in FIG. 2) which urges the respective pick-up coil assembly toward the pipe 22, as previously described. The tubular housing 66 also has an upwardly facing circumferential shoulder 70 in the inner periphery thereof to receive the outer edge portions of a diaphragm 72 formed of a magnetic material, such as soft iron, and its function will be described in detail hereinafter. In this connection, it should also be noted that the tubular housing 66 is formed out of a non-magnetic material, such as aluminum.

A circular cap member 74, also formed out of a non-magnetic material, is telescoped into the outer end portion of the housing 66 into contact with the outer face of the diaphragm 72 and is held in the desired orientation in the housing 66 by a suitable set screw 76 threaded through the wall of the housing 66. The cap member 74 is provided to support a horseshoe-shaped core piece 78 with the free ends 80 of the core piece 78 in contact with the outer face of the diaphragm 72. The core piece 78 is provided with coils and is utilized to pass a magnetic current through the diaphragm 72, as will be discussed in detail below. In this respect, it should be noted that FIGS. 3, 4 and 5 are mechanical types of drawings and do not illustrate any of the electrical conductors or coils utilized in the present apparatus, since these conductors, etc., are illustrated in FIG. 6 and will be discussed in detail below. The core piece 78 is held in a rigid position in the cap member 74 by a suitable set screw 82 threaded through the outer end portion of the cap member 74. It will also be noted that the outer end of the cap member 74 is slotted to receive the outer portion of the core piece 78 to facilitate the securing of the core piece 78 in the cap in such a manner that sufficient space is provided around the leg portions of the core piece for accommodating the coils to be described later.

The inner end 84 of the tubular housing 66 is secured to a curved supporting member 86 and to a pair of end members 88 by suitable bolts 90. The support member 86 is curved along its inner surface for the support of the pole pieces 58 thereon by suitable screws (not shown) and is formed out of a non-magnetic material to provide the minimum of interference with the flow of magnetic flux through the pole pieces 58. The end pieces 88 extend outwardly along the opposite sides of the housing 66 to receive the pins 62 which slidingly support the pick-up coil assembly 54 in the main housing 24, as previously described.

As shown most clearly in FIGS. 3 and 5, a pair of opposite hand core pieces 92 are secured in mating slots 94 in the opposite sides of the support member 86 and extend outwardly through the tubular housing 66 into contact with the inner face of the diaphragm 72. It will also be noted in FIG. 3 that the core pieces 92 are positioned along a line substantially at right angles to a line extending through the legs of the horseshoe-shaped core piece 78, for purposes which will be hereinafter set forth. Furthermore, it will be observed in FIG. 5 that sufficient space is provided around the portions of the core pieces 92 extending through the housing 66 for accommodating coils (not shown) which will be described hereinafter.

The inner end portions 96 of the core pieces 92 are tapered and extended toward one another to provide an air gap 98 between the core pieces 92 adjacent to the outer surface of the pipe 22. The pole pieces 58 are of the same cross-sectional size and configuration as the inner end portions 96 of the core pieces 92 and are secured to the supporting member 86 with the inner ends thereof in contacting relation with the inner end portions of the core pieces 92. It will therefore be observed that four of the pole pieces 58 are provided for each of the pick-up coil assemblies and that these pole pieces 58 extend around a portion of the circumference of the pipe 22 to effectively form continuations of the core pieces 92 and provide an air gap 98 extending transversely around a portion of the pipe 22. It will also be observed in FIG. 2 that the pole pieces 58 of the pick-up coil assemblies 54 are of such lengths that the pole pieces of adjacent pick-up coil assemblies are positioned apart a very short distance, which preferably measures about the same as the width of the air gap 98 of each of the pick-up coil assemblies. Therefore, when the pick-up coil assemblies 54 are supported in the desired positions in the main housing 24, the pole pieces 58 will effectively scan the entire circumference of the pipe 22. It will be understood that the pole pieces 58 and core pieces 92 are formed out of a magnetic material to efficiently conduct magnetic flux or currents.

A typical electrical circuit diagram for each of the pick-up coil assemblies 54 is illustrated in FIG. 6 and includes a pair of driver coils 100 and 102 wound around the opposite legs of the outer horseshoe-shaped core piece 78 and connected in series adding relation. The coil 100 is connected to ground and the coil 102 is connected to a suitable source 104 of alternating current energy through a transformer 106. Also, the secondary of the transformer 106 is connected to a source 108 of direct current energy, and the amplitude of the D.C. from the source 108 is at least one-half of the peak values of the A.C. provided by the source 104, such that the current fed to the driver coils 100 and 102 is in the form of a varying D.C. Therefore, a variable magnetic flux is passed through the diaphragm 72 which is usually directly between the free ends of the core piece 78, as will be described. However, it may be noted here that the current fed to the driver coils 100 and 102 is not of sufficient amplitude to saturate the diaphragm 72.

Pick-up coils 110 and 112 are wound around the core pieces 92 and are interconnected in series adding relation in the same manner as the coils 100 and 102 around the core piece 78. The coil 110 is connected to ground and the other coil 112 is connected to the secondary of a transformer 114. Generally speaking, when the air gap 98 is placed across a magnetic field, a non-varying magnetic flux is directed through the core pieces 92 and diaphragm 72, but no current is then induced in the coils 110 and 112. However, when the sources 104 and 108 are operating, the flux in the core pieces 92 is varied and increased, such that an A.C. current (having a phase as will be described) is induced in the coils 110 and 112 and is fed to the primary of the transformer 114, and the transformer 114 provides an increased output signal.

The secondary of the transformer 114 is connected to a servo amplifier 116 of any suitable type to amplify the output of the pick-up coil assembly and feed this output to a servo motor 118. The output shaft 120 of the motor 118 is turned in accordance with the phase of the output signal from the pick-up coil assembly as related to the phase of the source 104. In other words, as long as this ouput signal is in-phase with the source 104, the output shaft 120 is turned in one direction at a speed in accordance with the amplitude of the output signal, and when the output signal is of an opposite phase (180 degrees out of phase with the source 104) the output shaft 120 is turned in the opposite direction at a speed corresponding to the amplitude of the output signal.

When the voltage of the output signal is zero, the shaft 120 remains in a fixed position. The phase shifting network 121 is provided to shift the reference signal fed to the servo motor, as is common in the art.

The movements of the output shaft 120 are recorded on a conventional chart or log paper 122 by means of a continuous belt 124 extending around a pulley 126 mounted on the shaft 120 and an idler pulley 128. A suitable pen 130 is carried by the belt 124 and the belt 124 is extended transversely across the chart 122 to provide a line or curve 132 on the chart 122 representing variations in the output signal from the pick-up coil assembly 54. However, the output shaft 120 of the motor 118 is connected to the movable contact 134 of a potentiometer 136 by means of a suitable linkage indicated by the dashed line 138 to adjust the potentiometer 136 in accordance with movement of the shaft 120. The potentiometer 136 is provided with a suitable D.C. source 140 connected across the ends thereof, and the movable contact 134 of the potentiometer is in turn connected to one side of the primary of the transformer 114. The potentiometer 136 functions to feed a D.C. biasing current through the primary of the transformer 114 to the coils 110 and 112 which induces magnetic flux in pole pieces 92 substantially equal and opposite to the flux caused by a magnetic field around the pipe 22, thereby tending to stop a turning movement of the shaft 120 and hold the pen 130 of the recorder in a fixed position with respect to the chart 122. The purpose of the nulling potentiometer 136 is to facilitate the return of the pen 130 to a null condition and to prevent the pen 130 from being moved an excessive amount transversely across the chart 122, since the voltage source from the potentiometer contact 134 acts as an important portion of the negative feed-back loop of the servo system.

Figure 7:
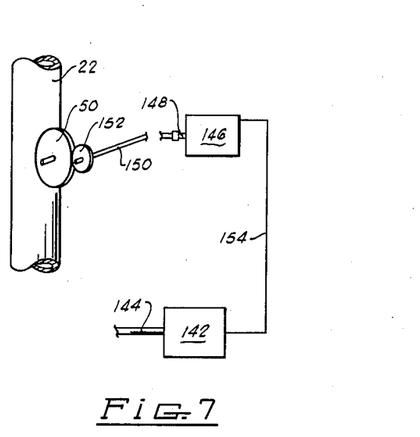
FIGURE 7 is a diagrammatic illustration of the system for driving the chart of the recorder illustrated in FIG. 6, in order to correlate the output of the recorder with the article being inspected.

The chart 122 is preferably mounted on a pair of rolls 139 in a conventional manner and is moved lengthwise through the recording mechanism underneath the pen 130 by a synchro motor 142 (sometimes known as a receiver) having its output shaft 144 connected to one of the rolls 139. As schematically illustrated in FIG. 7, the synchro motor 142 is connected to a synchro generator 146 (sometimes known as a transmitter) mounted in the main housing 24 (see also FIG. 2) and having an input shaft 148. The input shaft 148 is connected to a flexible shaft 150 leading from a friction roller 152. The friction roller 152 is in turn suitably mounted (not shown) in the main housing 24 in contact with one of the rollers 50 for turning the flexible shaft 150 and the input shaft 148 of the generator 146 in timed relation with the movement of the housing 24 along the pipe 22. The generator 146 and motor 142 may be of any suitable type, and are interconnected by conductors 154, such that the output shaft 144 of the motor 142 will be turned in a predetermined relation with respect to the rotation of the input shaft 148 of the generator 146. It will then be apparent that the chart 122 is moved through the recording device in timed relation with respect to the movement of the housing 24 along the pipe 22, such that the variations in the curve 132 on the chart 122 may be easily correlated with the length of the respective joint of drill pipe 22 and any flaws in the drill pipe may be accurately located, if desired.

The operation of the apparatus thus far described will be substantially apparent to those skilled in the art. With the pick-up coil assemblies 54 mounted in the main housing 24, as illustrated in FIG. 2, the housing 24 is opened on the hinge 42 and placed around one end portion of the joint of drill pipe 22. The latch is then closed to secure the housing 24 around the pipe, and the coil springs 60 retain the rollers 56 of the various pick-up coil assemblies in contact with the outer surface of the pipe 22. As much as possible of the electrical equipment required for the apparatus 20 is normally mounted in a truck or the like which may be positioned adjacent the testing site for the pipe 22. In a normal installation, therefore, the sources of electrical energy 30, 108 and 140 are mounted in the truck, along with the transformers 106 and 114, servo amplifiers 116 and servo motors 118, the recording device, and the potentiometers 136. The various conductors extending from the equipment mounted in the truck to the pick-up coil assemblies 54 and the magnetizing coils 28 are extended through the cables 32, and the cables 32 are of such lengths that the housing 24 may be freely moved along the length of the joint 22 without having to move the equipment truck. It may also be noted that the magnetizing coils 28 are simply telescoped over the end of the pipe 22 and mounted on the braces 26 at the beginning of an inspection run.

With the various equipment connected as illustrated in FIG. 6, the source 30 is energized to pass direct current through the magnetizing coils 28 and at least partially saturate the portion of the pipe 22 extending through the main housing 24. As the main housing 24 is moved along the pipe 22, the pole pieces 58 effectively scan the entire circumference of the pipe. Along those portions of the pipe 22 which are of substantially uniform structure, a minimum amount of magnetic flux leakage occurs around the outer surface of the pipe 22 and the flux in the core pieces 92 is nulled to substantially zero by action of the servo system. However, when the core pieces 92 are moved opposite a flaw in the pipe 22, substantial current is induced in the pick-up coils 110 and 112.

Figure 9:
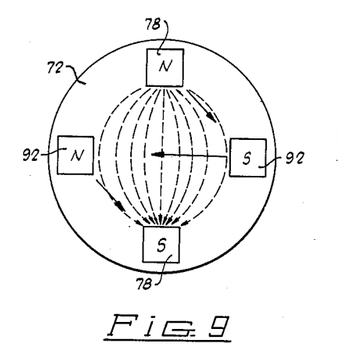
FIGURE 9 is a diagrammatic illustration of the flow of magnetic flux in the diaphragm of the preferred pick-up coil assembly, illustrating one possible theory of operation of the diaphragm.

Although we do not wish to be limited to any theory of operation, it is believed that (see FIG. 9) when the core pieces 92 are not subjected to any appreciable magnetic field (as when the respective pick-up coil assembly is being moved along a portion of the pipe 22 having no flaws) the outer ends of the core pieces 92 contacting the diaphragm 72 are neutral with respect to the core piece 78, and the magnetic flux generated by the driver coils 100 and 102 will merely pass through the diaphragm between the free ends of the core piece 78 as indicated by the dashed lines in FIG. 9. In this situation, therefore, none of the magnetic flux produced by the driver coils will be passed through the core pieces 92 to induce current in the pick-up coils 110 and 112. However, when a magnetic flux is passed through the core pieces 92 in one direction (as when the respective pick-up coil assembly approaches a flaw in the pipe 22) the outer ends of the core pieces 92 become opposite poles as indicated by the N and S thereon in FIG. 9. In this latter event, at least a portion of the magnetic flux produced by the driver coils passes directly from one of the free ends of the core piece 78 through a portion of the diaphragm 72 to one of the core pieces 92; then through the core pieces 92 and on through a portion of the diaphragm 72 to the other free end of the core piece 78 as indicated by the solid arrows in FIG. 9. It will be apparent that the flux passing through the core pieces 92 will therefore be substantially increased to induce a highly increased current in the pick-up coils 110 and 112. It will also be apparent that the output of the pick-up coils 110 and 112 will be in the form of A.C. When magnetic flux is passed through the core pieces 92 in an opposite direction (as when the respective pick-up coil assembly passes a flaw in the pipe) the flow of magnetic flux produced by the driver coils 100 and 102 will be in an opposite direction to induce a current in the pick-up coils 180 degrees out of phase with respect to the current which is induced when the magnetic flux flow is in the first-mentioned direction.

In any event, we have found that when the core piece 78 is positioned at right angles to a line passing through the core pieces 92 (as illustrated in FIG. 9) the magnetic flux passed through the diaphragm 72 in response to the action of the driver coils 100 and 102 does not produce any increased current in the pick-up coils when the core pieces 92 are moved along a portion of the pipe 22 having no flaws. On the other hand, we have found that when current is induced in the pick-up coils by movement of the core pieces 92 over a flaw in the pipe 22, the induced current is in the form of A.C. and is substantially increased when the described current is fed to the driver coils 100 and 102. Also, when the driver coils are operated, the phase of the current induced in the pick-up coils shifts 180 degrees as the core pieces 92 are moved over a flaw in the pipe 22. We have further found that when the core piece 78 is not positioned at almost precisely a right angle to a line passing through the core pieces 92, a current is induced in the pick-up coils at all times by the operation of the driver coils, and this current must be removed to keep from providing erratic action of the servo amplifier 116 and motor 118.

As previously indicated, the potentiometer 136 functions to counteract phase changes in the current fed to the transformer 114 and is an important part of the negative feedback loop of the servo system. For example, a rather severe crack extending transversely around a portion of the pipe 22 will provide adjacent prominent North and South poles oriented lengthwise along the pipe. As the air gap 98 approaches one of these poles, a current is induced in the pick-up coils 110 and 112 having a certain phase. However, when the air gap 98 is moved on past this one pole and in proximity with the adjacent magnetic pole, the current induced in the pick-up coils 110 and 112 is shifted 180 degrees in phase, such that the pen 130 will be moved in an opposite direction across the chart 122. The potentiometer 136 feeds D.C. to the pick-up coils to null out the effect of the magnetic field around the pipe when the shaft 120 turns, which tends to stop the movement of the shaft 120 and prevent an excessive movement of the pen 130 in either of these directions. As also previously described in detail, the chart 122 is driven in timed relation with the movement of the housing 24 along the pipe 22, such that any variations indicated by the curve 132 may be easily located on the pipe 22 for locating the flaws in the pipe.

Figure 8:
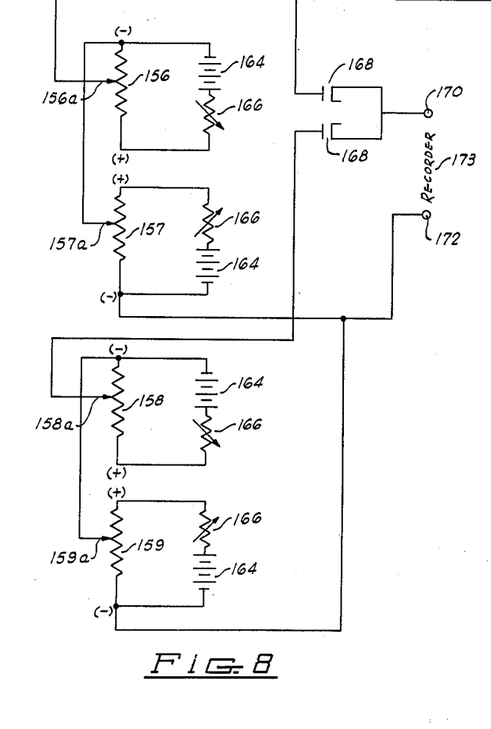
FIGURE 8 is a wiring diagram of the calipering system which measures the roundness of the article being inspected.

As previously indicated, the present invention also contemplates a novel calipering system for measuring the minimum diameter of the pipe 22 simultaneously with the inspection of the pipe for flaws. This calipering system comprises four potentiometers 156 through 159 as illustrated in FIG. 8, with each of the potentiometers having a movable contact which is designated by the same reference character, plus the suffix "a", such as 156a, 157a, etc. Also, each of these potentiometers has a D.C. energy power source 164 and variable resistor 166 to energize and control its potential. Each of the potentiometers 156 through 159 has the resistor thereof mounted in a holder 160 (see FIG. 2) which is in turn secured to the inner surface of the main housing 24 opposite one of the pick-up coil assemblies 54. Thus, the resistor of the potentiometer 156 may be mounted in the holder 160 opposite the left hand pick-up coil assembly 54 shown in FIG. 2, the resistor of the potentiometer 157 may be mounted in the holder 160 opposite the right hand pick-up coil assembly 54 shown in FIG. 2, and the resistors of the potentiometers 158 and 159 are mounted in holders 160 at the top and bottom, respectively, of the housing 24 as illustrated in FIG. 2. In addition, the movable contact of each of the potentiometers 156 through 159 is carried by a rod 162 extending from the respective pick-up coil assembly 54 for movement of the respective contact along the respective potentiometer resistor in response to radial movement of the respective pick-up coil assembly. The resistor of each potentiometer 156 through 159 may be easily wound in the form of a coil and mounted in the respective holder 160, such that the movable contact on the respective rod 162 may telescope through the respective holder 160 and resistor to vary the setting of the respective potentiometer in accordance with the radial position of the respective pick-up coil assembly.

The potentiometers 156 through 159 are illustrated in

FIG. 8 in accordance with their operational relationship. In other words, the potentiometers 156 and 157 are mounted on diametrically opposite sides of the inspecting apparatus, the movable contact 157a is connected to the negative end of the potentiometer 156, and the movable contact 156a is in turn connected to the plate of a diode 168. Also, the potentiometers 156 and 157 are arranged such that the contacts 156a and 157a move toward the positive ends of the respective potentiometers (toward one another as illustrated in FIG. 8) when the outer diameter of the pipe 22 gets smaller. As a result, the potential impressed on the movable contact 156a is made more positive as the diameter of the pipe 22, as measured along a line including the two pick-up coil assemblies 54 associated with the potentiometers 156 and 157, decreases, and this potential is imposed on the respective diode 168. The potentiometers 158 and 159 are connected in the same manner as the potentiometers 156 and 157, such that the potential imposed on the contact 158a is made more positive as the respective outer diameter of the pipe 22 decreases, and this potential is impressed on the plate of another diode 168. The cathodes of the diodes 168 are connected to a common terminal 170, such that only the more positive potential imposed on the diodes 168 will be impressed on the terminal 170. Another terminal 172 is connected to the negative ends of the potentiometers 157 and 159, such that the potential across the terminals 170 and 172 will be indicative of the minimum outside diameter of the pipe 22. This potential is in turn fed to a D.C. voltage recording device 173 for recording along with the curve 132 indicative of flaws in the pipe 22, such that a complete record of the characteristics of the pipe 22 is obtained.

Figure 9A:
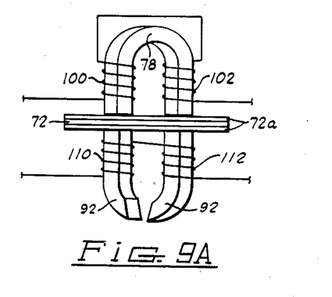
FIGURE 9A is a schematic drawing similar to a portion of FIG. 6 showing a modified diaphragm construction.

Although in the preferred embodiment the diaphragm 72 is not only magnetically coupled, but is also in physical contact with the outer ends of the core pieces 92 and with the free ends of the core piece 78, as previously described, it should be noted that the apparatus will also be operable (although perhaps not as efficiently) without such contact, as schematically illustrated in FIG. 9A. We have found that the diaphragm 72 may be separated from either or both of the core pieces 78 and 92 by, for example, layers of fiber 72a. As long as the diaphragm 72 remains magnetically coupled to the core pieces 78 and 92, the output of the pick-up coils 110 and 112 will be very similar to the output obtained in the preferred embodiment. In this construction the diaphragm 72 is either moved alternately toward and away from the core pieces 92, or functions according to the theory described above, to cyclically vary the reluctance of the magnetic circuit through the core pieces 92 and produce an increased induced current in the pick-up coils.

Figure 10:
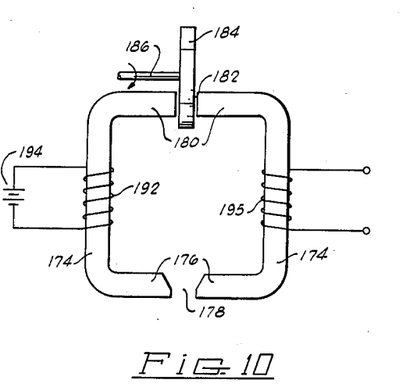
FIGURE 10 is a schematic illustration of a portion of another modified pick-up coil assembly.
Figure 11:
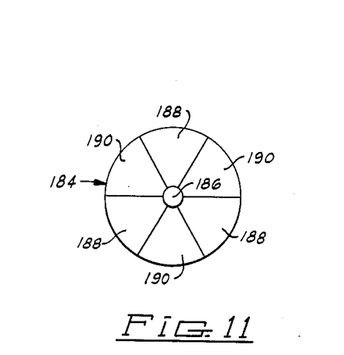
FIGURE 11 is an end view of the disc utilized in the assembly shown in FIG. 10 for varying the reluctance of the pick-up coil assembly.

A portion of a modified pick-up coil assembly is illustrated in FIGS. 10 and 11. In this modification, two opposite hand core pieces 174 are supported in the positions illustrated in FIG. 10, with one set 176 of their ends being positioned in spaced relation to form an air gap 178 similar to the air gap 98 in the preferred pick-up coil assembly. The opposite end portions 180 of the core pieces 174 are extended toward one another and arranged in spaced relation to provide a second gap 182. A disc 184 is rotatably supported by a shaft 186 in a position to extend one side or edge portion of the disc through the gap 182. As illustrated in FIG. 11, the disc 184 is constructed with alternating segments 188 and 190 of magnetic and non-magnetic material, respectively, such that the reluctance between the ends 180 of the core pieces 174 is varied in an alternating manner upon rotation of the disc 184. It will be understood that the core pieces 174 and the disc 184 are mounted in a pick-up coil housing in any suitable manner similar to the mounting of the elements in the pick-up coil assemblies 54 in the preferred embodiment to position the air gap 178 in proximity with the outer surface of the pipe being inspected. Also, a suitable drive means (not shown) is provided in the respective pick-up coil assembly for driving the shaft 186 and rotating the disc 184 at the desired speed.

A coil 192 is wound around one of the core pieces 174 and is connected to a source 194 of direct current energy to partially saturate the core pieces 174 and provide a more efficient operation of the assembly. The pick-up coil 195 is wound around the other core piece 174 and may be suitably connected (not shown) to a recording system in substantially the same manner as the pick-up coils 110 and 112 in the preferred embodiment. The pick-up coil 195 operates in the usual manner to generate a current therein by induction upon passage of the core pieces 174 through a varying magnetic field. Also, the disc 184 operates to alternately vary the reductance of the magnetic circuit through the core pieces 174, such that a substantial variation in the magnetic flux in the core pieces 174 will occur to induce a substantial current in the pick-up coil 195, even though the end portions 176 of the core pieces are cutting only a small number of lines of flux per unit of time. The end result is a substantial increase in the signals induced in the pick-up coil 195 with the only additional expenditure of energy being in the rotation of the disc 184, and it will be apparent that the disc 184 may be of light weight. It will also be observed that the pick-up coil 195 may be wound tightly on the respective core piece 174 and that a high degree of precision in the mounting and control of the disc 184 will not be required, to provide an economical and efficient pick-up coil assembly.

Figure 12:
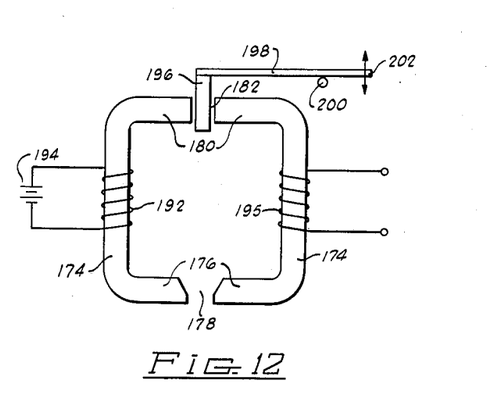
FIGURE 12 is a schematic view of still another modified pick-up coil assembly.

Another modified pick-up coil assembly is partially illustrated in FIG. 12 and may utilize the same type of core pieces 174 and coils 192 and 195 illustrated in the embodiment shown in FIG. 10. In this modification, a plate or segment of magnetic material 196 is mounted on the end of an arm 198 for movement in and out of the gap 182 upon an oscillating or vibrating motion of the arm 198. The arm 198 may be pivoted at 200 and have its opposite end 202 connected to a suitable vibrating means (not shown) for moving the plate 196 in and out of the gap 182 at the desired rate of speed. It will be apparent that the reluctance of the magnetic circuit through the core pieces 174 will therefore be varied in a manner similar to the embodiment shown in FIGS. 10 and 11 to provide an increased output of the pick-up coil 195. It will also be apparent that the magnetic plate or segment 196 may be relatively small size to require a minimum amount of energy for varying the reluctance of the magnetic circuit through the core pieces 174 and a precise control of the position or movement of the plate 196 will not be required.

From the foregoing, it will be apparent that the present invention provides a highly sensitive electro-magnetic flaw detecting apparatus which will detect substantially any type of flaw in a magnetized article. Current is induced in the pick-up coil at a much higher frequency than the frequency with which the pick-up coil cuts the magnetic lines of force adjacent a magnetized article being inspected, and, particularly in the preferred embodiment, the current induced in the pick-up coil is substantially increased with only minor variations in the magnetic field adjacent the article being inspected. It will also be apparent that the present invention provides a novel means for correlating the events appearing on a log produced by the detecting apparatus and the article inspected, such that the precise location of flaws in the article may be precisely determined, and that the minimum diameter of a tubular article being inspected may be measured and recorded simultaneously with the inspection of the article for flaws. Finally, it will be apparent that the present invention provides a simply constructed electro-magnetic flaw detecting apparatus which may be economically manufactured and operated and which will have a long service life.

Changes may be made in the combination and arrangement of parts or elements as heretofore set forth in this

We claim:

1. In a flaw detecting apparatus for inspecting a magnetized ferromagnetic article, the combination of: a pair of elongated magnetic material core pieces; housing means supporting said core pieces in parallel relation with one set of their ends in spaced relation forming an air gap for positioning adjacent a surface of the magnetized article; means for moving said housing means along the magnetized article and moving said one set of ends of the core pieces through magnetic lines of flux leaking from said surface of the magnetized article; a pick-up coil around at least one of said core pieces for generating a current in proportion to variations in the magnetic flux density in said core pieces; means for registering the variations in current induced in the pick-up coil; a magnetic material diaphragm magnetically coupled to the opposite set of ends of said core pieces, and magnetic flux generating means for passing a varying magnetic current into and from the diaphragm at points positioned in the diaphragm along a line extending substantially at right angles to a line extending through said opposite set of ends of said core pieces and extending substantially midway between said opposite set of ends of said core pieces.

2. Apparatus as defined in claim 1 wherein said magnetic flux generating means comprises a horseshoe-shaped magnetic core having its free ends magnetically coupled to said diaphragm along a line at substantially right angles to a line extending through said opposite set of ends of said core pieces, at least one driver coil wound around said horseshoe-shaped magnetic core, and means for passing a varying D.C. current through said driver coil.

3. Apparatus as defined in claim 2 wherein said means for passing a varying D.C. current through said driver coil comprises a transformer having a primary and having its secondary connected to said driver coil, a source of A.C. current connected to the primary of the transformer, and a source of D.C. connected to the secondary of the transformer.

4. Apparatus as defined in claim 2 wherein said diaphragm is supported in spaced relation from said opposite set of ends of said elongated core pieces and from the free ends of said horseshoe-shaped core piece, and wherein said diaphragm is flexible to move toward and away from said opposite set of ends of said elongated core pieces when the varying D.C. current is passed through said driver coil.

5. Apparatus as defined in claim 2 wherein said diaphragm is supported in contact with said opposite set of ends of said elongated core pieces and in contact with the free ends of said horseshoe-shaped core piece.

6. Apparatus as defined in claim 1 wherein said means for registering the variations in current induced in the pick-up coil includes a transformer having a secondary and having one end of its primary connected to the pick-up coil, a servo amplifier connected to the secondary of the transformer, a servo motor connected to the servo amplifier and having an output shaft rotatable in response to the signals induced in the pick-up coil, a recorder connected to the servo motor output shaft, a potentiometer having a resistor biased with D.C. and a contact slidable along the resistor, a conductor connecting said contact to the other side of the primary of said transformer to null out the effect of the flux in said core pieces in accordance with the setting of the potentiometer, and means connecting the servo motor output shaft to said contact for adjusting the setting of the potentiometer in a direcion constantly tending to stop the servo motor output shaft.

7. In an apparatus for measuring the magnitude and direction of a magnetic field, the combination of: a pair of elongated magnetic material core pieces, means for supporting said core pieces with one set of their ends in spaced relation forming an air gap across the magnetic lines of force in the magnetic field and directing magnetic lines of flux through said core pieces in a direction depending upon the direction of the magnetic field, a magnetic material diaphragm magnetically coupled to the opposite set of ends of said core pieces for passing magnetic lines of force between said opposite set of ends, means for passing a varying magnetic flux into and from the diaphragm at points in the diaphragm positioned along a line at substantially right angles to a line extending through said opposite set of ends of said core pieces, a pick-up coil wound around at least one of said core pieces, and means for registering the phase and amplitude of the current induced in the pick-up coil, whereby said phase is indicative of the direction of the magnetic field and said amplitude is indicative of the strength of the magnetic field.

8. Apparatus as defined in claim 7 wherein said registering means includes a source of D.C. energy connected to the pick-up coil for inducing magnetic flux in said core pieces substantially equal and opposite to the magnetic flux produced in said core pieces by the magnetic field for measuring the magnitude of the magnetic field.

9. Apparatus as defined in claim 7 wherein said means for passing a varying magnetic flux into and from the diaphragm comprises a horseshoe-shaped magnetic material core having its free ends magnetically coupled to the diaphragm along a line extending at substantially right angles to said opposite set of ends, a driver coil wound around said horseshoe-shaped core, and means for passing a varying D.C. current through the driver coil.

10. Apparatus as defined in claim 9 wherein said diaphragm is in physical contact with said opposite set of ends of said elongated core pieces.

11. Apparatus as defined in claim 9 wherein said diaphragm is in physical contact with said opposite set of ends of said elongated core pieces and with the free ends of said horseshoe-shaped core.

12. Apparatus as defined in claim 9 wherein said diaphragm is supported in spaced relation from said opposite set of ends of said elongated core pieces.

13. Apparatus as defined in claim 9 wherein said diaphragm is supported in spaced relation from said opposite set of ends of said elongated core pieces and from the free ends of said horseshoe-shaped core.

14. Apparatus as defined in claim 9 wherein said means for passing a varying D.C. current through said driver coil comprises a transformer having one side of its secondary connected to the driver coil and having a primary, a source of A.C. current connected to said primary, and a source of D.C. current connected to the other side of said secondary having an output signal with an amplitude at least as large as the peak values of the output from the A.C. source.

References Cited in the file of this patent

UNITED STATES PATENTS

| | | |
|---|---|---|
| 1,782,462 | Chappuzeau et al. | Nov. 25, 1930 |
| 1,886,336 | Gunn | Nov. 1, 1932 |
| 1,933,547 | Drake et al. | Nov. 7, 1933 |
| 2,290,330 | Irwin | July 21, 1942 |
| 2,685,672 | Price et al. | Aug. 3, 1954 |
| 2,700,703 | Nordyke | Jan. 25, 1955 |
| 2,870,541 | Mayes | Jan. 27, 1959 |
| 2,886,772 | Gresham et al. | May 12, 1959 |
| 2,912,642 | Dahle | Nov. 10, 1959 |